D. C. MOORE.
MATCH BOX.
APPLICATION FILED MAR. 12, 1910.
975,978.
Patented Nov. 15, 1910.
2 SHEETS—SHEET 1.
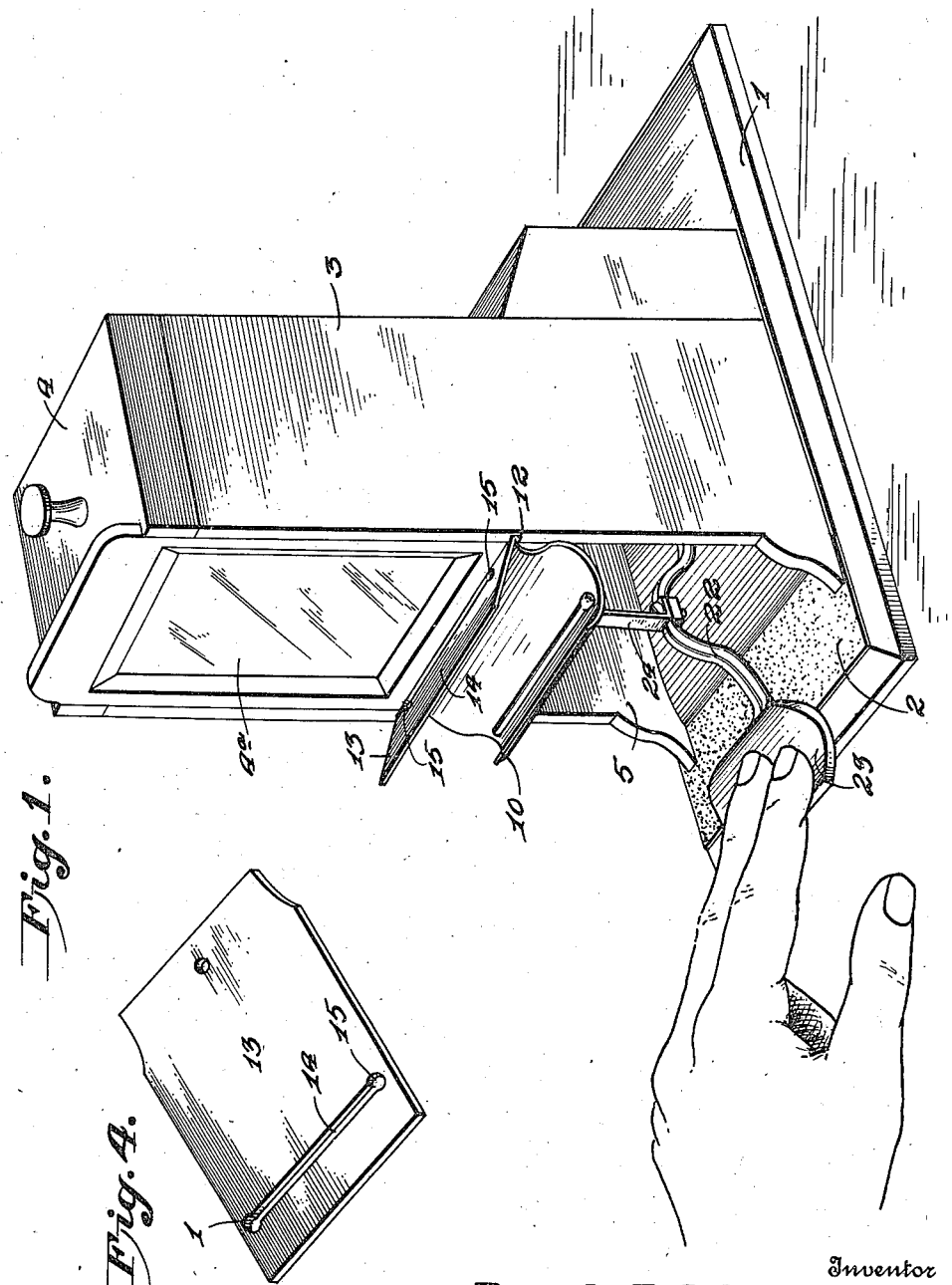
Witnesses
Inventor
David C. Moore,
By E. E. Vrooman,
his Attorney.

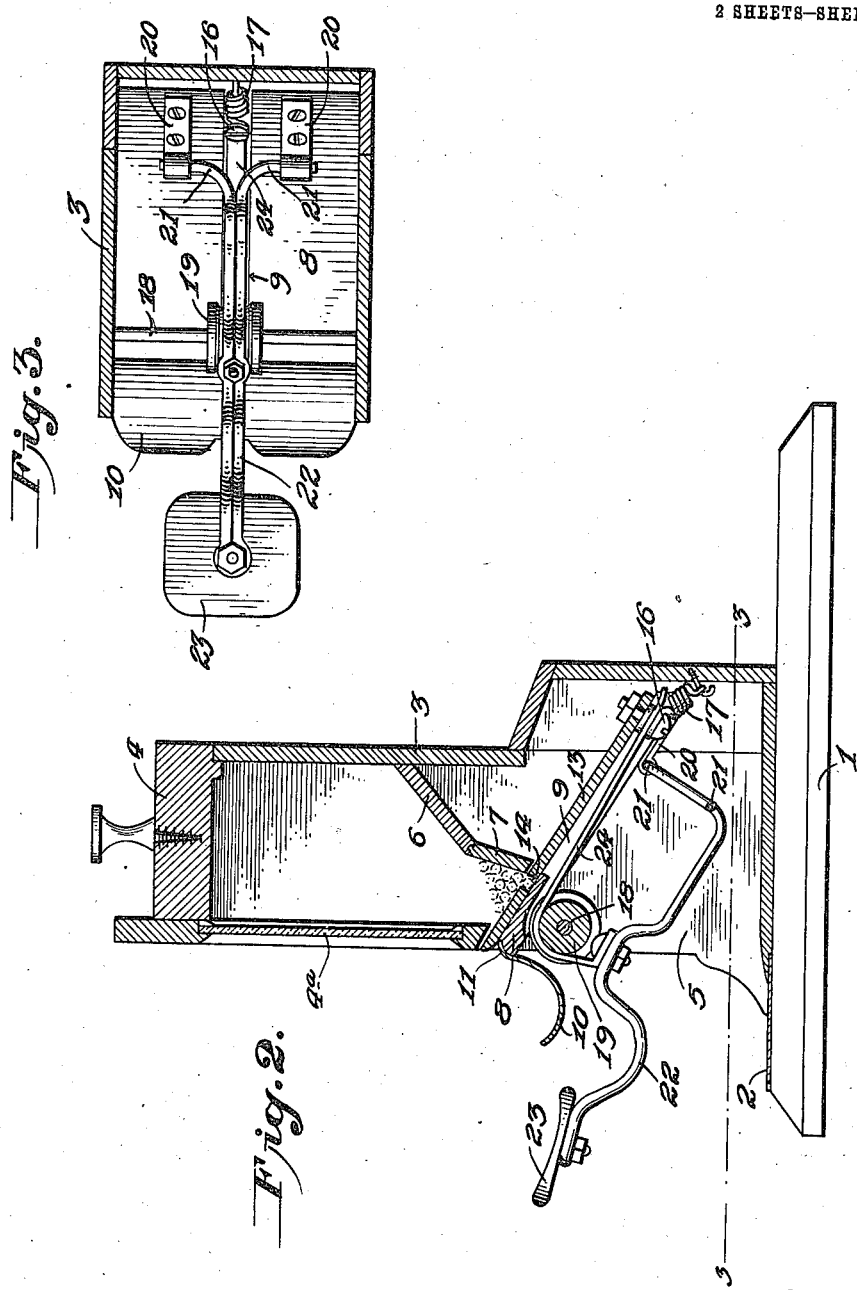

UNITED STATES PATENT OFFICE.

DAVID CLEVELAND MOORE, OF CISCO, TEXAS.

MATCH-BOX.

975,978. Specification of Letters Patent. Patented Nov. 15, 1910.

Application filed March 12, 1910. Serial No. 548,886.

*To all whom it may concern:*

Be it known that I, DAVID C. MOORE, a citizen of the United States of America, residing at Cisco, in the county of Eastland and State of Texas, have invented certain new and useful Improvements in Match-Boxes, of which the following is a specification, reference being had therein to the accompanying drawing.

This invention relates to match dispensing receptacles, and the principal object of the same is to provide the receptacle with means whereby but one match at a time will be delivered.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of the improved match receptacle. Fig. 2 is a central vertical sectional view thereof. Fig. 3 is a horizontal sectional view taken on the line 3—3, Fig. 2, looking up. Fig. 4 is a detail perspective view of the match delivery slide.

Referring to said drawings by numerals, 1 designates the base of the improved match dispensing receptacle which is flat and preferably elongated. On the upper surface of the front end of the base 1 a strip of abrasive material 2 is provided upon which matches may be ignited. A vertically arranged casing 3 is supported by said base, said casing having a removable top 4 so that access may be had to the interior of said casing, and with a transparent front 4ᵃ through which the contents of the casing may be inspected.

The lower portion 5 of casing 3 is enlarged and the front thereof is preferably open. Adjacent the junction of the upper portion of casing 3 with the enlarged lower portion 5, a downwardly inclined bottom 6 is provided for said upper portion, said bottom extending from the back of the casing to a point slightly beyond the center thereof and terminating in a pendent guiding section 7.

A downwardly inclined partition plate 8 extends across the casing 3 below the guiding section 7. The upper end of said plate is located beneath the lower end of the transparent front 4, the lower end of said plate projecting into the enlarged lower portion 5 of the casing. Plate 8 is provided with a centrally located longitudinally arranged guide slot 9. A receiving tray 10 which may be formed of sheet metal, has its upper edge 11 fastened to the upper end of said plate 8, said tray being preferably of the full width of the casing 3 and projecting across the front thereof.

The sides of casing 3 are each provided with an incline groove 12, said grooves being parallel with, but in a slightly higher plane than plate 8. A delivery slide 13 is slidably mounted in said grooves 12, said slide having an elongated slot 14 formed through its outer end portion, the ends 15 of said slot being enlarged. A bolt 16 or the like projects through the rear end of said slide 13, said bolt having one end passing through the slot 9 of plate 8. A spring 17 connects said bolt to the rear wall of the lower portion of casing 3, said spring tending to normally retain slide 13 within the casing. A shaft 18 extends across the open front of the lower portion of casing 3, said shaft being below the front end of plate 8 and having a grooved roller 19 mounted thereon.

Plate 8 has a pair of pivot ears 20 on its under surface adjacent the rear end thereof, which are engaged by the divergent ends 21 of a lever 22 that projects beyond the open front of casing 3 and is equipped with a plate 23 at its outer end by means of which said lever may be manually rocked. Said lever is preferably formed of a single length of rod metal doubled to provide the body and the said divergent ends. Intermediate of the length of said body, one end of strap 24 is clamped thereto, said strap passing over roller 19 and extending beneath plate 8 and parallel with the slot 9 of said plate and having its other end fastened to the pendent end of bolt 16.

In operation, the upper portion of casing 3 is filled with matches so that they will feed toward the outlet between bottom section 7 and the front of said casing, said outlet being closed by slide 13 which has its slot 14 in position to receive a match. With the parts of the invention in such position, it will be seen that a downward pressure on lever 22 will cause the forward end of slide 13 to project beyond the front of casing 3 so that a match in slot 14 will be drawn outward with said slide and when slot 14 is clear of plate 8, the match will drop to tray 10. When the pressure is released from lever 22, spring 17 will return slide 13 to its normal position, and owing to the strap connection between said slide and lever, the said lever will be rocked to its normal position. As will be obvious, the end recesses of slot 14 are for the purpose of permitting the heads of the matches to readily pass therethrough.

What I claim as my invention is:—

1. A match receptacle comprising a casing provided with a match compartment, said compartment provided with an outlet, a slide receiving matches one at a time from said outlet, a stationary plate beneath said slide and provided with a guide slot, a roller in the front of said casing beneath said plate, a hand lever having one end connected to the rear of said plate, a strap connection between said lever and the rear end of said slide, said strap passing over said roller and through said guide slot, and a spring connection between said slide and the rear of said casing.

2. A dispensing receptacle comprising an article casing provided with a discharge outlet, a stationary plate beneath said outlet, a delivery slide slidably mounted on said plate and provided with an article receiving slot, said plate provided with a guide slot, an operating lever pivotally connected to said casing, and a strap connection between said lever and slide, said strap passing through the guide slot of said plate.

In testimony whereof I hereunto affix my signature in presence of two witnesses.

DAVID CLEVELAND MOORE.

Witnesses:
R. C. PASS,
R. A. ST. JOHN.